United States Patent
Lee

(10) Patent No.: US 8,217,977 B2
(45) Date of Patent: Jul. 10, 2012

(54) COLOR IMAGE FORMING APPARATUS AND CONTROL METHOD THEREOF

(75) Inventor: Sang Hyong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1095 days.

(21) Appl. No.: 12/030,364

(22) Filed: Feb. 13, 2008

(65) Prior Publication Data

US 2008/0198419 A1 Aug. 21, 2008

(30) Foreign Application Priority Data

Feb. 15, 2007 (KR) .................. 10-2007-0016011

(51) Int. Cl.
B41J 2/435 (2006.01)
B41J 2/47 (2006.01)
(52) U.S. Cl. .............................. 347/235; 347/250
(58) Field of Classification Search .............. 347/229, 347/234, 235, 248–250
See application file for complete search history.

(56) References Cited

U.S. PATENT DOCUMENTS

| | | | | |
|---|---|---|---|---|
| 6,833,856 B2 * | 12/2004 | Maeda | .......................... | 347/248 |
| 6,969,846 B2 * | 11/2005 | Tanaka et al. | ................. | 250/239 |
| 7,433,074 B2 * | 10/2008 | Takata | .......................... | 358/1.7 |
| 2006/0017795 A1 * | 1/2006 | Nomura et al. | ............... | 347/232 |

FOREIGN PATENT DOCUMENTS

JP 11-55472 2/1999

* cited by examiner

Primary Examiner — Hai C Pham
(74) Attorney, Agent, or Firm — Stanzione & Kim LLP

(57) ABSTRACT

A color image forming apparatus and a control method thereof to correct an error between scanning lines due to an alignment error between the laser scanning units corresponding with each color of the image forming apparatus on the basis of a difference of detection times between termination signals for each color when the scanning units output a horizontal synchronization signal and a termination signal to scan a line. A difference of termination times between termination detecting sensors may be used to variably set video clocks for each color, thus reducing the number of components required and reducing the signal processing load. A single sensor may be used to detect the synchronization and termination signals, thus further reducing manufacturing costs.

22 Claims, 17 Drawing Sheets

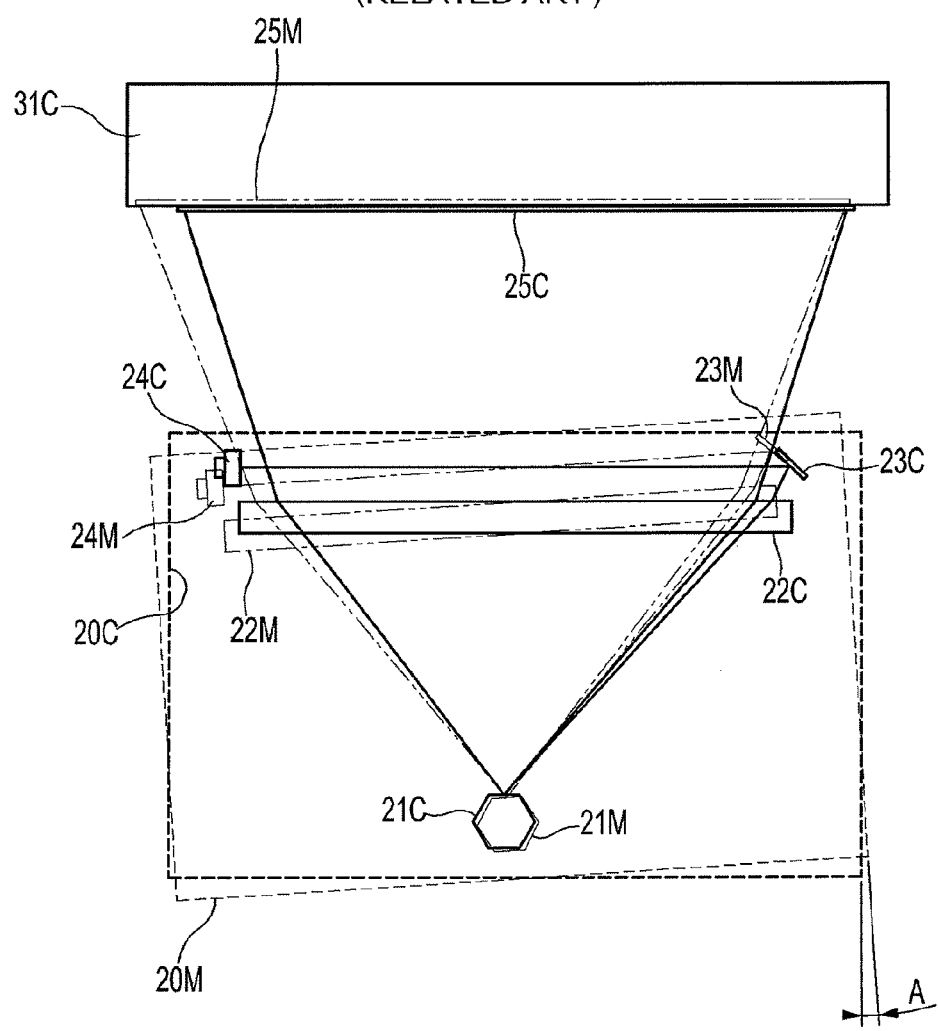

COLOR IMAGE FORMING APPARATUS AND CONTROL METHOD THEREOF

CROSS-REFERENCE TO RELATED APPLICATIONS

This application claims the benefit of Korean Patent Application No. 2007-16011, filed on Feb. 15, 2007, in the Korean Intellectual Property Office, the disclosure of which is hereby incorporated in its entirety by reference.

BACKGROUND OF THE INVENTION

1. Field of the Invention

The present general inventive concept relates generally to a color image forming apparatus capable of correcting an error between scanning lines for each color due to an alignment error between laser scanning units, and a control method of the color image apparatus.

2. Description of the Related Art

As illustrated in FIG. 1, a conventional color image forming apparatus includes a paper feeding unit 10, laser scanning units 20K, 20C, 20M and 20Y, developing cartridges 30K, 30C, 30M and 30Y, photoconductive drums 31K, 31C, 31M and 31Y, a transfer unit 40, a fixing unit 50, and a paper discharge unit 60. In these conventional laser scanning units, the developing cartridge and the photoconductive drum are typically individually provided for each color.

If a printing instruction is input to the color image forming apparatus, images for each color are formed on the photoconductive drums 31K, 31C, 31M and 31Y by laser beams radiated from the laser scanning units 20K, 20C, 20M and 20Y for each color, respectively. Once the images are formed, a paper P fed from the feeding unit 10 passes between a paper transfer belt 41 and each of the photoconductive drums 31K, 31C, 31M and 31Y. At this time, the images for each color respectively formed on the photoconductive drums 31K, 31C, 31M and 31Y are transferred onto the paper P by respective corresponding transfer rollers while being overlapped with each other. The paper P, onto which the images are transferred, passes through the fixing unit 50 for applying high-temperature heat and pressure such that the images are fixed on the paper. The paper is then discharged to the outside through the paper discharge unit 60.

The colors of toners used in a developer are yellow Y, magenta M, cyan C and black K. The respective four colors are transferred to overlap with one another, thereby forming a complete image. In order to provide an image with a high image quality, unit images formed by the respective colors should exactly overlap with one another.

In a case where a plurality of laser scanning units are provided corresponding to the different colors of toners, and where the scanning positions of laser beams radiated from the laser scanning units are not registered for each color, unit images for each color do not exactly overlap with each other.

Laser scanning units corresponding to the different colors may deviate from one another when they are mounted. Further, even though each laser scanning unit is mounted at a right position, the laser scanning units may deviate from one another due to vibrations generated when driving a polygonal mirror for deflecting a laser beam during use of the laser scanning unit.

For example, FIG. 2 illustrates a case where laser scanning units 20C and 20M for respectively scanning laser beams for cyan and magenta deviate from each other at a predetermined angle A. Here, the scanning positions of scanning lines of laser beams respectively deflected by rotatably driven polygon mirrors 21C and 21M inside the upper and lower laser scanning units 20C and 20M are misaligned, causing the scanning lines scanned on the surfaces 25C and 25M of the photoconductive drums 31C and 31M corresponding to cyan and magenta through fθ lenses 22C and 22M to be different from each other.

In a conventional image forming apparatus, whenever a laser beam of the corresponding color image is scanned for a line from each of the laser scanning units 20C and 20M, a horizontal synchronization signal is output. As illustrated in FIG. 3A, such horizontal synchronization signals Hsync[C] and Hsync[M] for each color is reflected by reflection mirrors 23C and 23M, and then received by optical sensors 24C and 24M, respectively. The horizontal synchronization signals Hsync[C] and Hsync[M] are synchronized with each other. However, as illustrated in FIG. 3B, the scanning position and length of scanning lines Line[C] and Line [M] respectively scanned on the photoconductive drums 31C and 31M may not correspond to each other due to a position error between laser scanning units 20C and 20M.

Conventionally, an auto color registration is performed to solve such a position error. A method is applied, in which a difference between positions of scanning lines for each color in accordance with the result of the performance of the auto color registration is detected, and horizontal synchronization signals for each color is then corrected in order to correct the difference between the positions as illustrated in FIG. 4A. As a result, scanning lines for each color respectively scanned photoconductive drums can be set to correspond to each other in accordance with the corrected horizontal synchronization signals as illustrated in FIG. 4B.

However, according to the conventional method, a color registration operation should be performed whenever a printing operation is performed for a certain time, and a process of printing a test pattern on a paper, scanning the test pattern, and then analyzing the test pattern is typically carried out to perform the operation. For this reason, there is a problem in that a load of signal processing for the analysis of the test pattern is weighted.

In order to solve such a problem, a method has been proposed in Japanese Unexamined Patent Publication No. 11-55472, in which a termination detecting sensor is additionally mounted at a scanning termination region in addition to a synchronization detecting sensor for detecting horizontal synchronization signals. In this method, a laser beam scanning time is counted from a time point when a horizontal synchronization signal is detected by the synchronization detecting sensor to a time point when a termination signal is detected by the termination detecting sensor, and an image data read timing is shifted according to the result obtained by comparing the counted scanning time with a reference value, thereby correcting an error between scanning lines for each color.

The method according to the above document may be simpler than the conventional color registration operations discussed previously above. However, one drawback of the method proposed in JP Pub. No. 11-55472 is that a reference clock with a high frequency should be used to count a scanning time from a synchronization detection time to a scanning termination time whenever a line is scanned, with results being that a process of storing information counted using such a reference clock is required. Accordingly, additional components for implementing such a method are required. Moreover, the problem related to a weighted load for signal processing still remains.

Further, the method proposed in JP Pub. No. 11-55472 is also limited in that a termination detecting sensor should be provided separately from the synchronization detecting sensor, thus requiring separate sensors to detect the synchronization and termination signals, respectively.

SUMMARY OF THE INVENTION

The present general inventive concept provides a color image forming apparatus including sensors to detect synchronization signals and termination signals of laser scanning units, wherein the frequency of a video clock may be set in accordance with a result obtained from counting a difference of termination points detected by the termination detecting sensors corresponding to the laser scanning units, and a control method of the color image forming apparatus.

The present general inventive concept also provides a color image forming apparatus capable of setting frequencies of video clocks for each color based on a termination point detected by any one of termination detecting sensors when termination points detected by the termination detecting sensors are different from each other, and a control method of the color image forming apparatus.

The present general inventive concept also provides a color image forming apparatus capable of selectively detecting a horizontal synchronization signal and a termination signal using one sensor in order to correct scanning positions of scanning lines for each color, and a control method of the color image forming apparatus.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing a color image forming apparatus, including a plurality of laser scanning units corresponding to respective colors and to output a horizontal synchronization signal and a termination signal to scan a line, a signal detecting unit mounted adjacent the laser scanning units to detect the horizontal synchronization signal and the termination signal, and a controller to output video data for each color using the horizontal synchronization signal and the termination signal detected by the detecting unit, and to correct an error between scanning lines for each color in accordance with a difference of detection times between the termination signals for each color.

The signal detecting unit may include a plurality of sensors to separately detect the horizontal synchronization signal and the termination signal.

The signal detecting unit may further include a support to install the sensors.

The signal detecting unit may include a single sensor to selectively detect the horizontal synchronization signal and the termination signal.

The signal detecting unit may further include a support to attach the single sensor, and a reflection mirror mounted adjacent the support to reflect any one of the horizontal synchronization signal and the termination signal.

The signal detecting unit may further include a light gathering member to gather the horizontal synchronization signal and the termination signal to the single sensor.

The controller may include a video clock generator to variably set frequencies of video clocks for each color in accordance with the difference between the termination signals for each color and to output video clocks in accordance with the variably set frequencies, and a video controller to generate video data in accordance with the video clocks of the video clock generator.

If a time interval between an initial detection of the termination signal of one color and a final detection of the termination signal of another color is different, the controller may set a frequency of a video clock corresponding to the final termination signal based on the initial termination signal.

If the termination signal for the another color is relatively later than the initial termination signal, the controller may set the frequency of the video clock applied to the another color to be greater than the frequency of the video clock applied to the one color.

The foregoing and/or other aspects and utilities of the present general inventive concept may also be achieved by providing a method of controlling a color image forming apparatus having a plurality of laser scanning units corresponding to respective colors and to output a horizontal synchronization signal and a termination signal to scan a line, the method including detecting the horizontal synchronization signal and the termination signal with a signal detecting unit mounted adjacent the laser scanning units, and correcting an error between scanning lines for each color based on a difference of detection times between the termination signals for each color.

The operation of correcting the error may include variably setting frequencies of video clocks for each color in accordance with the difference between the termination signals for each color, outputting video clocks in accordance with the variably set frequencies, and generating video data in accordance with the video clocks.

If the detection time of the termination signal of one color is relatively later than the detection time of another color, the frequency of the video clock applied to the one color may be greater than the frequency of the video clock applied to the another color.

If a time difference occurs between the termination signals of each color, the frequency of the video clock of each color may be set corresponding to a final termination signal based on an initial termination signal.

The foregoing and/or other aspects and utilities of the present general inventive concept may also be achieved by providing a color image forming apparatus, including a plurality of laser scanning units to output a horizontal synchronization signal and a termination signal corresponding to a position of a scanned line, a signal detecting unit to detect the termination signal and the horizontal synchronization signal, and a controller to correct a position error between the scanned lines based on a difference in detection times between the termination signals of the scanning units.

The controller may correct the position error without considering a scanning time between the horizontal synchronization signal and the termination signal.

The color image forming apparatus may further include a video clock generator to count a time difference between the termination signals of each scanning unit, and to variably set a video clock frequency for each scanning unit based on the time difference between each termination signal.

The video clock frequency of an earliest detected termination signal may be used as a reference frequency, and the video clock frequencies of later detected termination signals may be variably set to be larger than the reference frequency according to the time difference between the later detected termination signal and the earliest detected termination signal.

The signal detecting unit may include a single sensor to detect both the horizontal synchronization signal and the termination signal, and a reflection mirror to reflect either one or both of the horizontal synchronization signal and the termination signal to the single sensor.

The foregoing and/or other aspects and utilities of the present general inventive concept may also be achieved by providing a method of controlling a color image forming apparatus, including detecting a horizontal synchronization signal and a termination signal corresponding to a position of a scanned line from each laser scanning unit, and correcting a position error between the scanned lines based on a difference of detection times between the termination signals.

An earliest detected termination signal may be used as a reference signal, and the correcting may be based on a difference of detection times between the reference signal and the other termination signals.

The foregoing and/or other aspects and utilities of the present general inventive concept may also be achieved by providing a method of controlling a color image forming apparatus having a plurality of laser scanning units to output a line corresponding to each laser scanning unit, the method including detecting a termination point of each line, and correcting a position error of the lines based on a difference of the termination points of the lines, without counting a scanning time of the lines.

The foregoing and/or other aspects and utilities of the present general inventive concept may also be achieved by providing a color image forming apparatus, including a plurality of laser scanning units to output a line corresponding to each laser scanning unit, a detecting unit to detect a termination point of each line, and a controller to correct a position error of the lines based on a difference of the termination points of the lines, without counting a scanning time of the lines.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which:

FIG. 2 is a view illustrating an alignment error between laser scanning units in a conventional color image forming apparatus;

DETAILED DESCRIPTION OF THE PREFERRED EMBODIMENTS

Figure 1:
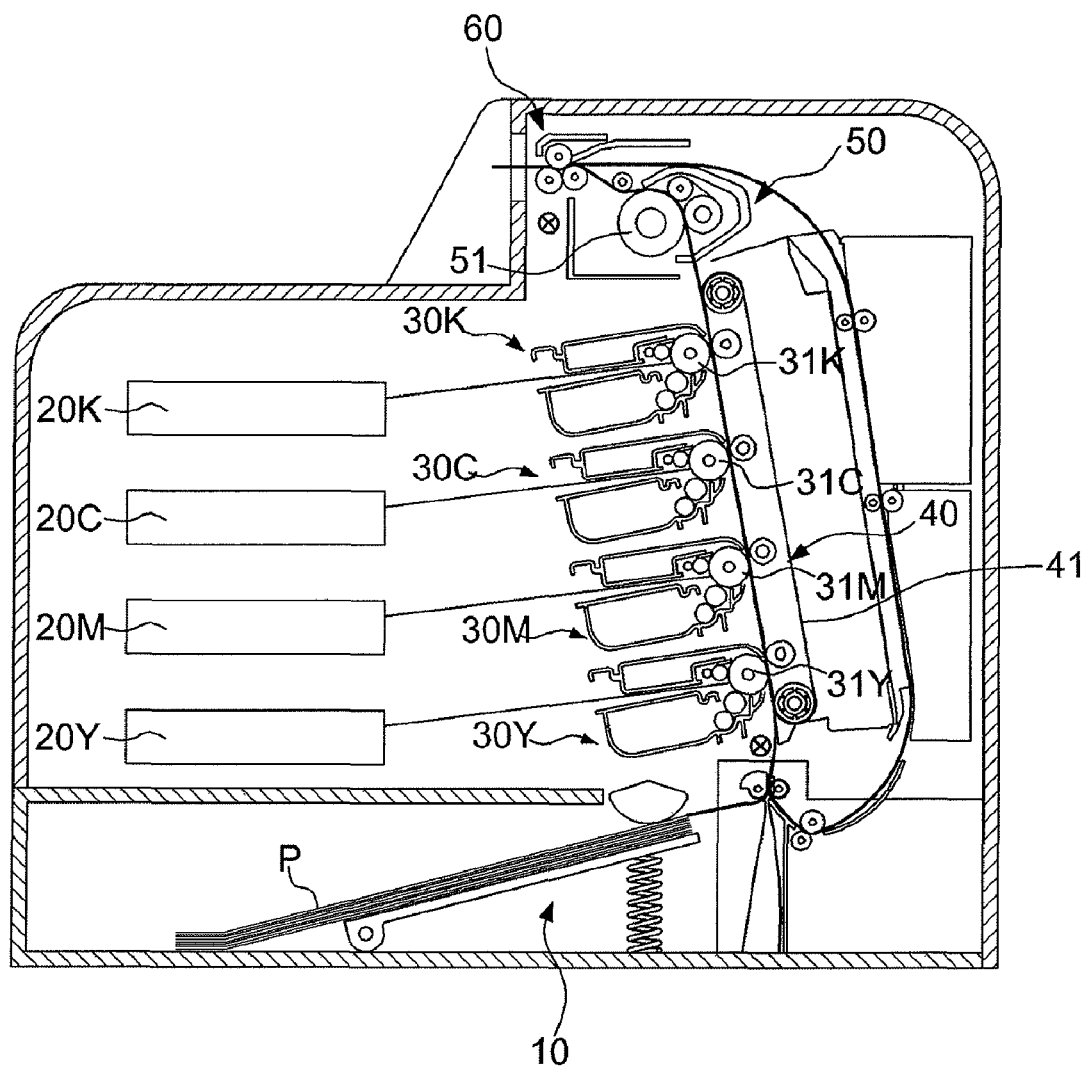
FIG. 1 is a sectional view illustrating a configuration of a conventional color image forming apparatus.
Figure 3A:
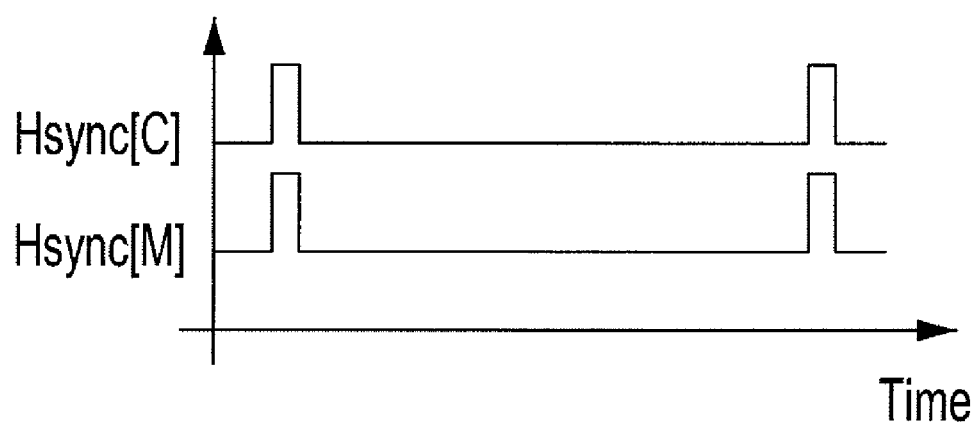
FIG. 3A is a view illustrating timings of horizontal synchronization signals detected by a synchronization detecting sensor in a laser scanning unit.
Figure 3B:
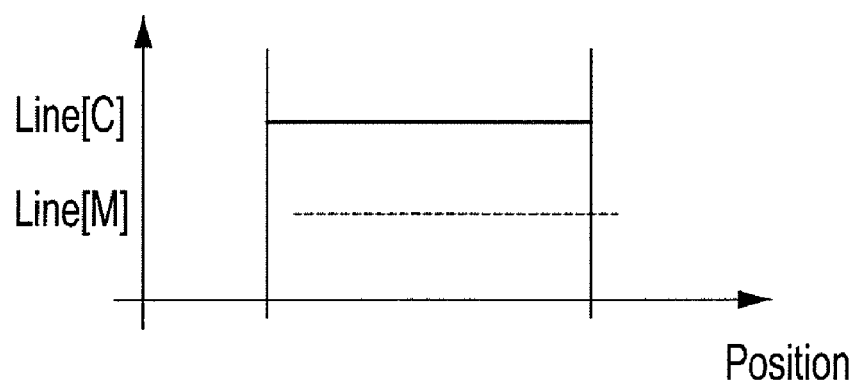
FIG. 3B is a view illustrating an error between scanning lines in a case where a scanning line is scanned on a photoconductive drum on the basis of the horizontal synchronization signal of FIG. 3A.
Figure 4A:
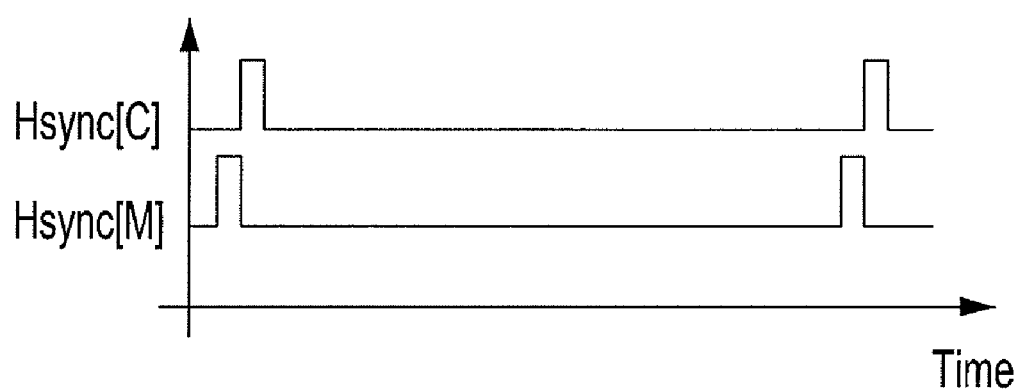
FIG. 4A is a view illustrating timing of a horizontal synchronization signal in which a start position is corrected in accordance with a result obtained by performing an auto color registration.
Figure 4B:
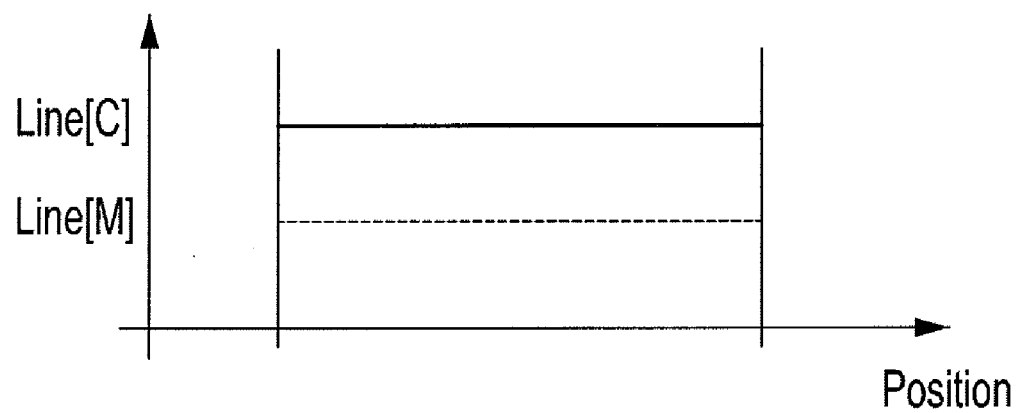
FIG. 4B is a view illustrating a case where an error between scanning lines is corrected on the basis of the horizontal synchronization of FIG. 4A.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

In accordance with the present general inventive concept, a synchronization detecting sensor and a termination detecting sensor may be used to correct an error between scanning positions of laser scanning units associated with each of the colors of an image forming apparatus. The termination detecting sensor may check whether a difference occurs between scanning termination times for each color, and the frequency of a video clock for each color may then be variably set in accordance with the checked result, thereby correcting the position error between the scanning positions. For convenience of illustration, the following embodiments of the present general inventive concept will be described in terms of position errors with respect to scanning units for cyan and magenta. However, it is understood that the present general inventive concept is not limited to these colors, but also may be applied to correct position errors between scanning lines for each color of the image forming apparatus, which may include a plurality of two or more colors.

Figure 5:
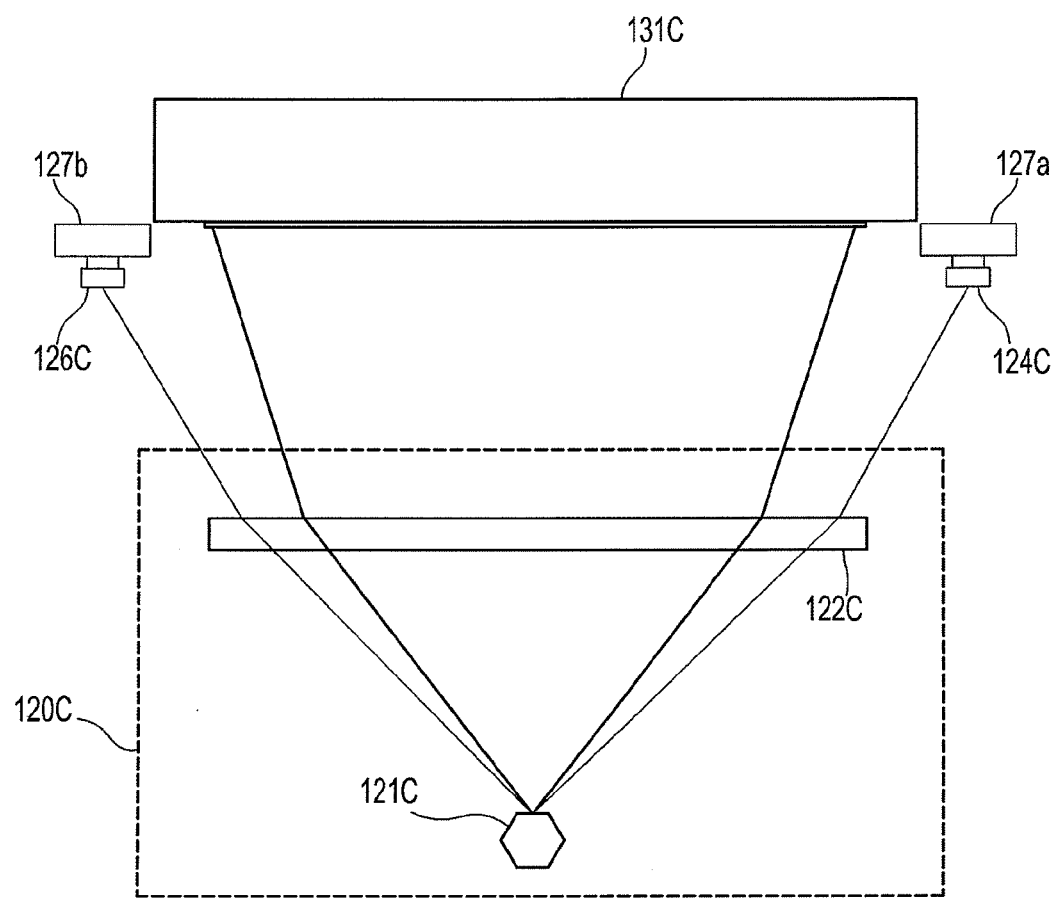
FIG. 5 is a view illustrating a synchronization detecting sensor and a termination detecting sensor applied to a color image forming apparatus according to an embodiment of the present general inventive concept, in which the synchronization detecting sensor and the termination detecting sensor are mounted adjacent a laser scanning unit for cyan color.

FIG. 5 illustrates a color image forming apparatus according to an embodiment of the present general inventive concept. Here, a synchronization detecting sensor 124C and a termination sensor 126C may be mounted adjacent a laser scanning unit 120C, which for purposes of illustration is chosen to represent the color cyan. A laser beam radiated by a laser diode (not shown) may be deflected by a polygon mirror 121C and then scanned on a photoconductive drum 131C through an fθ lens 122C. At this time, a horizontal synchronization signal and a termination signal may be generated to scan a scanning line. The horizontal synchronization signal may be detected by the synchronization detecting sensor 124C, and the termination signal may be detected by the termination detecting sensor 126C.

Figure 6:
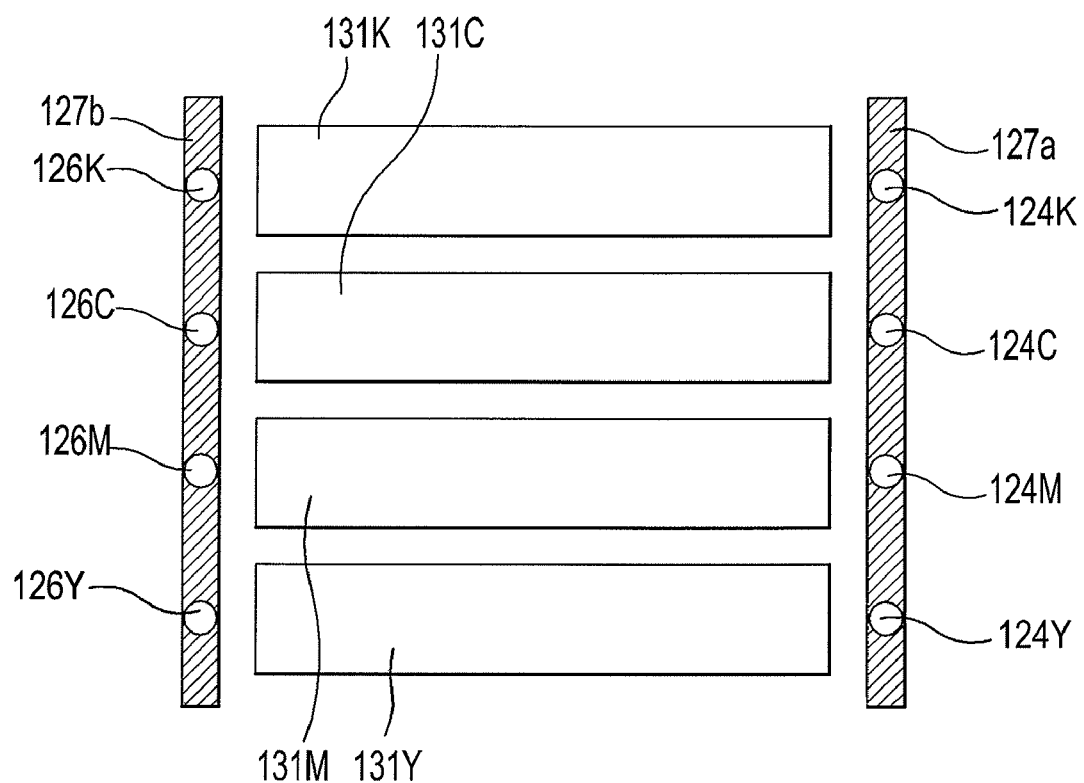
FIG. 6 is a view illustrating a mounting structure of the synchronization detecting sensor and the termination detecting sensor of FIG. 5.

The synchronization detecting sensor and termination detecting sensor of FIG. 5 may be separately provided for each color. As illustrated in FIG. 6, synchronization detecting sensors and termination detecting sensors may be attached at a predetermined interval to supports 127a and 127b arranged at both sides of photoconductive drums 131K, 131C, 131M and 131Y for black, cyan, magenta and yellow, which may be arranged in a sub-scanning direction. For example, a synchronization detecting sensor 124C to detect a horizontal synchronization signal indicating the start position of a scanning line scanned on the photoconductive drum 131C for cyan may be attached to the support 127a, and a synchronization detecting sensor 124M to detect a horizontal synchronization signal indicating the start position of a scanning line scanned on the photoconductive drum 131M for magenta may be attached to the support 127a below the synchronization detecting sensor 124C at a predetermined interval. Further, a termination detecting sensor 126C to detect a termination signal indicating the termination position of a scanning line scanned on the photoconductive drum 131C for cyan may be attached to the support 127b, and a termination detecting sensor 126M to detect a termination signal indicating the termination position of a scanning line scanned on the photoconductive drum 131M for magenta may be attached to the support 127b below the termination detecting sensor 126C at a predetermined interval.

Similarly, synchronization detecting sensors 124K and 124Y and termination detecting sensors 126K and 126Y respectively corresponding to black and yellow may also be attached to the supports 127a and 127b arranged at both sides of the photoconductive drums 131K and 131Y, respectively.

Figure 7:
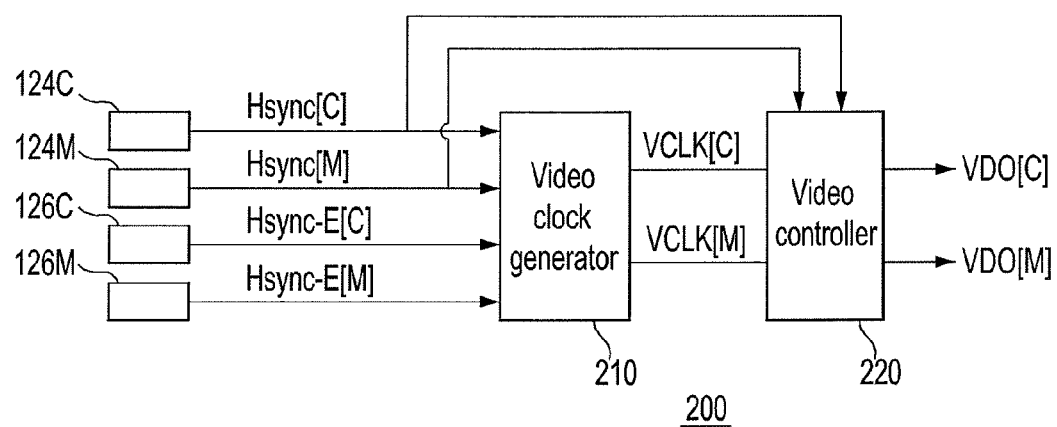
FIG. 7 is a block diagram of the color image forming apparatus according an embodiment of the present general inventive concept.

FIG. 7 is a block diagram of the color image forming apparatus according to an embodiment of the present general inventive concept. For convenience of illustration, an operation of signal processing will be mainly described below with respect to cyan and magenta, but it is understood that similar operations may also be performed for each of the respective colors of the image forming apparatus.

As illustrated in FIG. 7, a controller 200 to control operations of the image forming apparatus may include a video clock generator 210 and a video controller 220.

The video clock generator 210 outputs video clocks VCLK[C] and VCLK[M] with frequencies set by the received horizontal synchronization signals Hsync[C] and Hsync[M] and termination signals Hsync-E[C] and Hsync-E[M] respectively detected by the synchronization detecting sensors 124C and 124M for cyan and the termination detecting sensors 126C and 126M for magenta. The frequencies of the video clocks VCLK[C] and VCLK[M] responsively corresponding to cyan and magenta may be initially set to be identical with each other.

The video controller 220 may then generate video data VDO[C] and VDO[M] for cyan and magenta using the video clocks VCLK[C] and VCLK[M] and horizontal synchronization signals Hsync[C] and Hsync[M], which in turn may respectively provide the video data VDO[C] and VDO[M] to laser diodes inside the laser scanning units for the corresponding colors. Each of the laser diodes may then radiate a laser beam corresponding to the video data onto a polygon mirror.

A position error between the laser scanning units may occur due to relatively large tolerance in mounting operations and/or due to vibrations in the printing operations. As mentioned above, this position error may cause the scanning lines scanned on the photoconductive drums to be misaligned one from the other.

Figure 8:
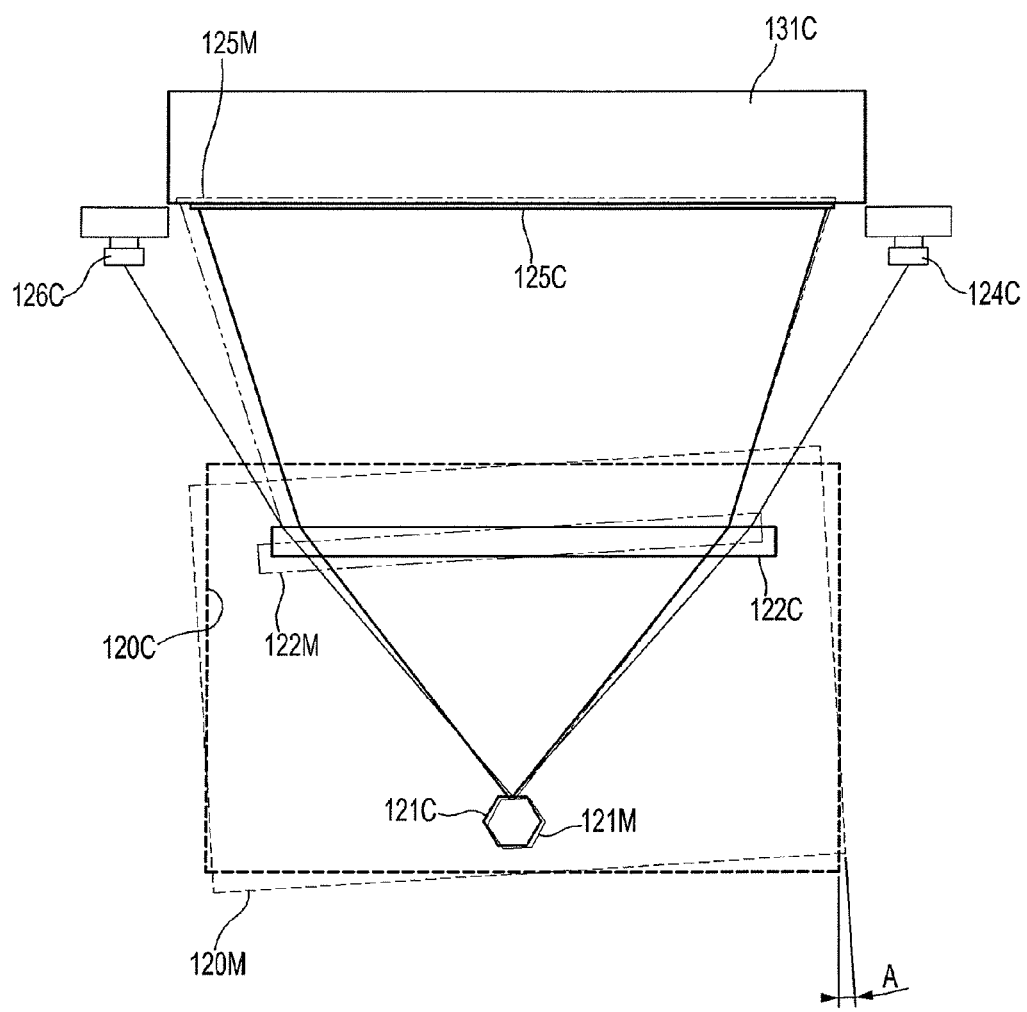
FIG. 8 is a view illustrating an alignment error between laser scanning units in a color image forming apparatus according to an embodiment of the present general inventive concept.
Figure 9A:
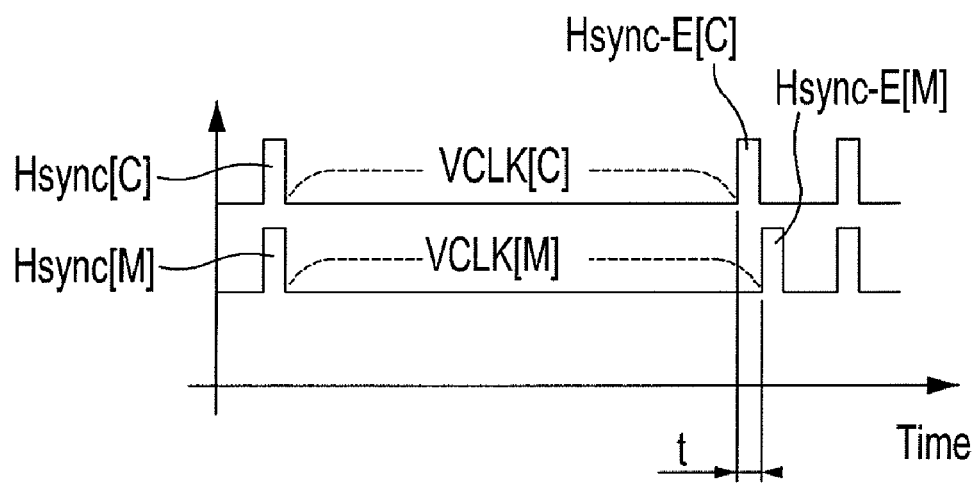
FIG. 9A is a view illustrating timings of a horizontal synchronization signal and a termination signal, respectively detected by a synchronization detecting sensor and a termination detecting sensor.
Figure 9B:
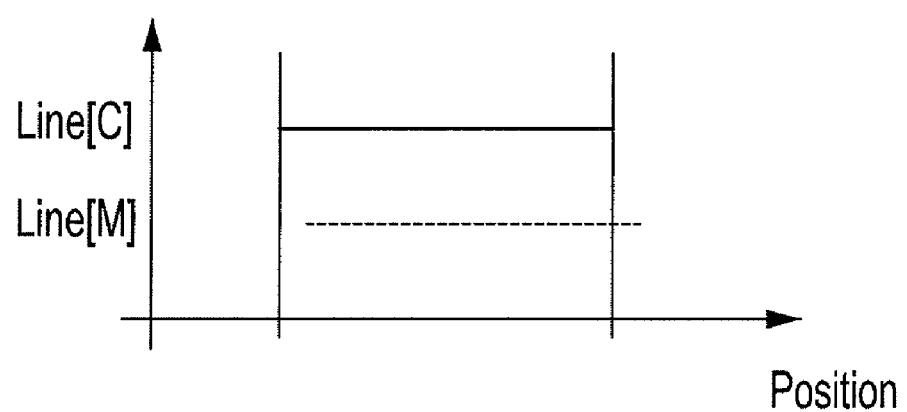
FIG. 9B is a view illustrating an error between scanning lines in a case where a line is scanned on the basis of the horizontal synchronization signal of FIG. 9A.

For example, as illustrated in FIG. 8, in a case where the laser scanning units 120C and 120M and their respective scanning laser beams for cyan and magenta deviate from each other at a predetermined angle A, the scanning positions of scanning lines of laser beams may be misaligned after they are respectively deflected by the rotatably driven polygon mirrors 121C and 121M inside the upper and lower laser scanning units 120C and 120M. As a result, the scanning lines scanned on the surfaces 125C and 125M of the photoconductive drums 131C and 131M through fθ lenses 122C and 122M may be different from each other. As illustrated in FIG. 9A, although the synchronization detection signals Hsync[C] and Hsync[M] for cyan and magenta may be synchronized with each other to be provided to the video clock generator 210, a predetermined time difference t occurs between termination detecting signals Hsync-E[C] and Hsync-E[M] for cyan and magenta. As a result, scanning lines Line[C] and Line[M] for cyan and magenta may not be synchronized with each, and an error between scanning positions may occur as illustrated in FIG. 9B, and the lengths of the scanning lines may be different from each other.

Such an error between the scanning positions may be recognized by the video clock generator 210. For example, the video clock generator 210 may variably set the frequencies of video clocks for cyan and magenta, considering a time difference t counted from when a termination signal for cyan is initially detected to when a termination signal for magenta is detected.

Figure 10A:
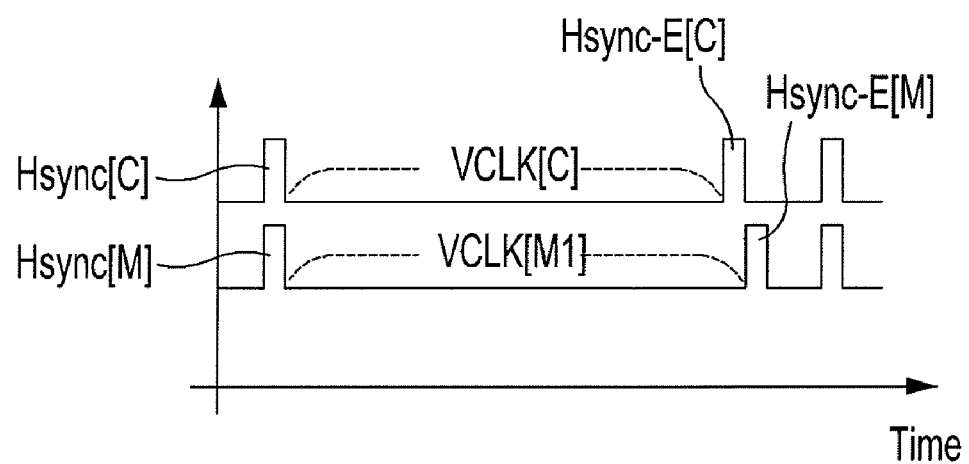
FIG. 10A is a view illustrating timings of a horizontal synchronization signal and a termination signal for each color, corrected according to an embodiment of the present general inventive concept.
Figure 10B:
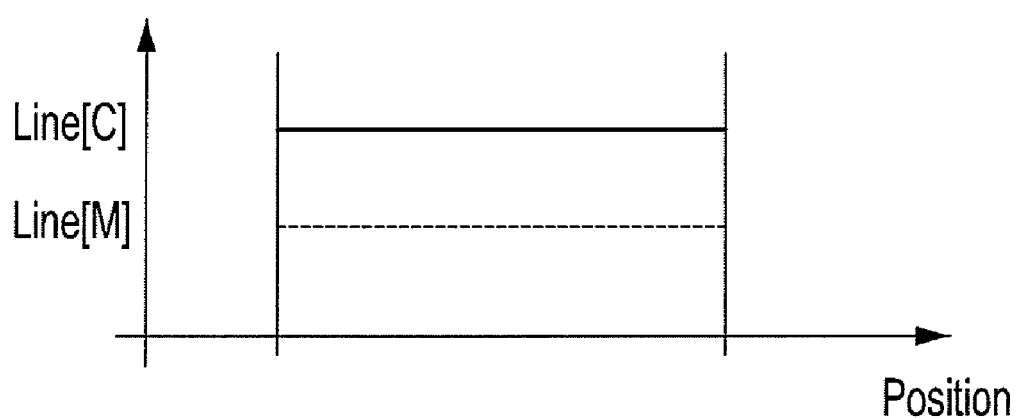
FIG. 10B is a view illustrating scanning lines for each color, respectively generated by applying the corrected horizontal synchronization signal and termination signal of FIG. 10A.

As illustrated in FIG. 10A, the video clock generator 210 sets a video clock VCLK[C] applied in scanning a scanning line from when a horizontal synchronization signal Hsynch[C] for cyan is generated to when a termination signal Hsynch-E[C] for cyan is generated to be identical with the previous video clock VCLK[C]. However, the video clock generator 210 sets a video clock VCLK[M1] applied in scanning a scanning line from when a horizontal synchronization signal Hsynch[M] for magenta is generated to when a termination signal Hsynch-E[M] for magenta is generated to be larger than the previous video clock VCLK[M] to compensate for the earlier detected termination signal Hsynch-E[C] for cyan. The video controller then 220 outputs video data using the frequency of the variably set video clock and the horizontal synchronization signal. Accordingly, the error and length of a scanning line can be corrected by variably setting the frequency of a video clock as illustrated in FIG. 10B.

In the aforementioned embodiment, the video clock generator 210 may count a difference between detection times of the respective termination signals, and then variably set the frequency of the video clock in accordance with the counted time difference. It is understood that the present general inventive concept may also be applied to an image forming apparatus having three or more colors. In a case where the times counted from when a termination signal is initially detected to when all termination signals are finally detected are different for each color, the frequencies of video clocks corresponding to the other termination signals may be set to be large with respect to the initially detected termination signal as a reference. That is, if the detection time of a termination signal for a color is later than the earlier detected termination signal for another color, the frequency of a video clock applied to the later color is set to be larger relative to the frequency of the reference signal, thereby setting the scanning position and length of a scanning line based on the earlier reference signal.

In another embodiment of the present general inventive concept which will be described below, one sensor may be used to detect both the horizontal synchronization signals and termination signals.

Figure 11:
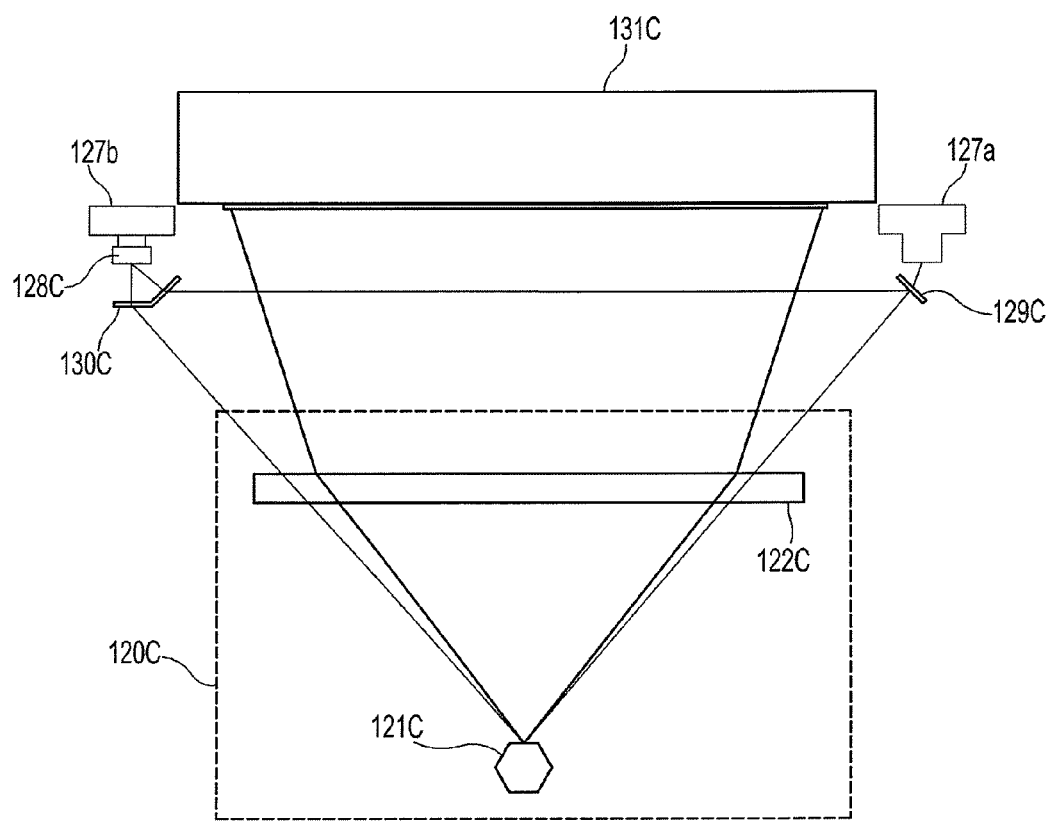
FIG. 11 is a view illustrating a sensor to detect both horizontal synchronization signals and termination signals, applied to a color image forming apparatus according to another embodiment of the present general inventive concept.

As illustrated in FIG. 11, one sensor 128C to detect both horizontal synchronization signals and termination signals may be attached to one support 127b mounted outside a laser scanning unit 120C for cyan. Further, a reflection mirror 129C to detect horizontal synchronization signals may be mounted in front of the other support.

The reflection mirror 129C may reflect a horizontal synchronization signal radiated from the laser scanning unit to the sensor 128C, which then receives the horizontal synchronization signal. After a predetermined time, a laser beam for a scanning line radiated from the laser scanning unit 120C may be scanned onto a photoconductive drum 131C. Then, a termination signal radiated from the laser scanning unit 120C may be received by the sensor 128. Here, the horizontal synchronization signal, the termination signal, and the laser beam for a scanning line may be deflected by a polygon mirror 121C to be radiated through a fθ lens 122C. The reflection mirror 129C may be positioned to reflect either one or both of the horizontal synchronization signals and termination signals to the single sensor 128C.

A light gathering member 130C may be additionally mounted in front of the sensor 128C such that horizontal synchronization signals and termination signals reflected by the reflection mirror 129C can be better received by the sensor 128.

As such, the horizontal synchronization signals and termination signals may be received using one sensor 128C. Once these signals are received, an operation to correct errors of positions and lengths between scanning lines for each color by variably setting frequencies of video clocks on the basis of a time difference between termination signals for each color received by the sensor may be implemented as described above. Therefore, a further description of the correcting operations described above will not be repeated.

Figure 12:
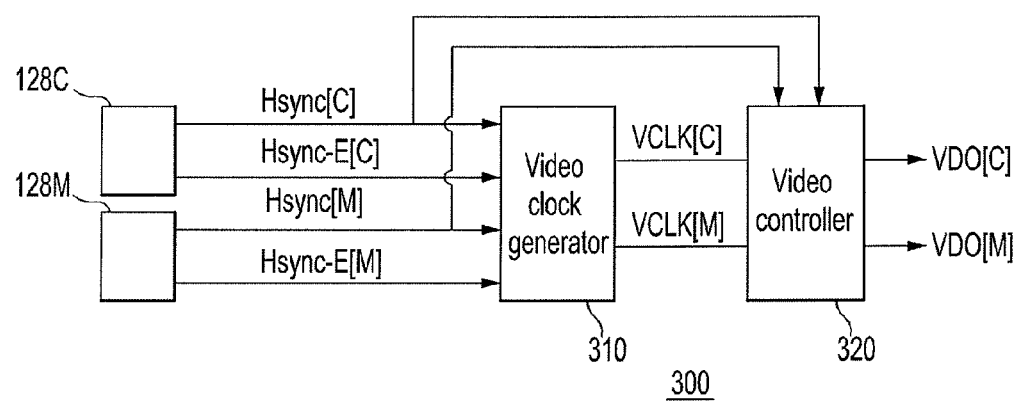
FIG. 12 is a block diagram of the color image forming apparatus according to another embodiment of the present general inventive concept.

FIG. 12 is a block diagram of the color image forming apparatus according to another embodiment of the present general inventive concept. Again, for convenience of illustration, the color image forming apparatus includes a controller 300 to correct errors of positions and lengths between scanning lines corresponding to cyan and magenta, but it is understood that the controller 300 may correct errors between scanning lines corresponding to each of the plurality of colors of an image forming apparatus.

The controller 300 may include a video clock generator 310 and a video controller 320.

The video clock generator 310 may receive horizontal synchronization signals Hsync[C] and Hsync[M] and termination signals Hsync-E[C] and Hsync-E[M] through one sensor 128C or 128M for each color. The video clock generator 310 counts a time difference between the termination signals Hsync-E[C] and Hsync-E[M], and variably sets the frequencies of video clocks for each color in accordance with the time difference. The video clock generator 310 then provides the variably set video clocks VCLK[C] and VCLK[M] to the video controller 320.

The video controller 320 may then output video data VDO[C] and VDO[M] for cyan and magenta using the video clocks VCLK[C] and VCLK[M] provided from the video clock generator 310 and the horizontal synchronization signals Hsync [C] and Hsync[M], which signals may be respectively detected by the one sensor 128C or 128M.

A control method of a color image forming apparatus according to the present general inventive concept will now be described with reference to the flowchart of FIG. 13. It is understood that this control method may be applied to embodiments in which a synchronization detecting sensor and a termination detecting sensor are individually provided as illustrated in FIG. 5, or to embodiments having one sensor to detect the horizontal synchronization signals and termination signals as illustrated in FIG. 11.

Figure 13:
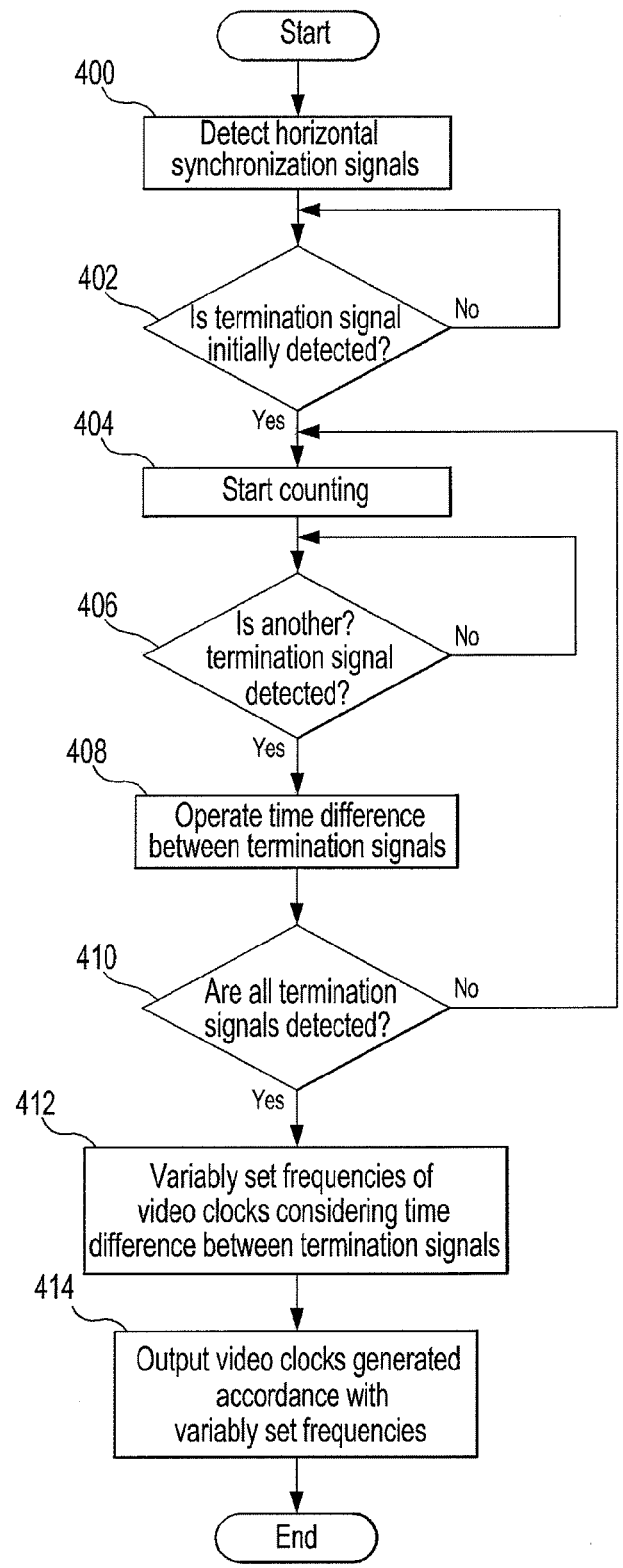
FIG. 13 is a flowchart illustrating a control method of a color image forming apparatus according to an embodiment of the present general inventive concept.

As illustrated in FIG. 13, in operation 400, horizontal synchronization signals radiated from laser scanning units for each color may be detected by sensors 124C and 128C. After laser beams for a scanning line have been scanned, a controller may then determine which termination signal for any one of several colors is initially detected, as represented at operation 402.

In a case where a termination signal is initially detected, video clock generators 210 and 310 start counting as represented at operation 404. Then, the controller may determine whether a termination signal for another color is detected as represented at operation 406. In a case where it is determined that another termination signal is detected, a difference between the termination signals for the colors is calculated as represented at operation 408.

Next, it may be determined whether termination signals for all the colors are detected as represented at operation 410. In a case where it is determined that termination signals for all the colors are not detected, the controller proceeds to the operation 404. In a case where termination signals are detected, the frequencies of video clocks for each color may be variably set considering time differences among the termination signals for each color as represented at operation 412. Here, if a detection time of a termination signal is later than the reference signal, the frequency of a video clock signal for a corresponding color may be set to be larger.

Then, video clocks for each clock may be generated in accordance with the variably set frequencies to be provided to video controllers 220 and 320. The video controllers 220 and 320 may then output video data for each color using the video clocks for corresponding colors and the horizontal synchronization signals as represented at operation 414.

As described above, according to embodiments of the present general inventive concept, since the frequencies of video clocks may be set in accordance with the result obtained by counting a difference of termination times between termination detecting sensors, a time for an object to be counted may be reduced as compared with the prior art. Accordingly, low-priced components may be used, and a load of signal processing may be reduced.

Further, according to embodiments of the present general inventive concept, horizontal synchronization signals and termination signals may be simultaneously detected using one sensor, so that manufacturing costs can be even further reduced.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A color image forming apparatus, comprising:
   a plurality of laser scanning units corresponding to respective colors and to output a horizontal synchronization signal and a termination signal to scan a line;
   a signal detecting unit mounted adjacent to the laser scanning units to detect the horizontal synchronization signal and the termination signal corresponding to each respective color; and
   a controller to output video data corresponding to each respective color using the horizontal synchronization signal and the termination signal corresponding to each respective color detected by the detecting unit, and to correct an error between a scanning line corresponding to a first color of the respective colors and a scanning line corresponding to a second color of the respective colors in accordance with a difference of detection times between the termination signal corresponding to the first color and the termination signal corresponding to the second color.

2. The color image forming apparatus of claim 1, wherein the signal detecting unit has a plurality of sensors to separately detect the horizontal synchronization signal and the termination signal.

3. The color image forming apparatus of claim 2, wherein the signal detecting unit further includes a support to install the sensors.

4. The color image forming apparatus of claim 1, wherein the signal detecting unit has a single sensor to selectively detect the horizontal synchronization signal and the termination signal.

5. The color image forming apparatus of claim 4, wherein the signal detecting unit further includes a support to attach the single sensor, and a reflection mirror mounted adjacent to the support to reflect any one of the horizontal synchronization signal and the termination signal.

6. The color image forming apparatus of claim 5, wherein the signal detecting unit further includes a light gathering member to gather the horizontal synchronization signal and the termination signal to the single sensor.

7. The color image forming apparatus of claim 1, wherein the controller includes a video clock generator to variably set frequencies of video clocks for each color in accordance with the difference between the termination signals for each color and to output video clocks in accordance with the variably set frequencies, and a video controller to generate video data in accordance with the video clocks of the video clock generator.

8. The color image forming apparatus of claim 1, wherein if a time interval between an initial detection of the termination signal of one color and a final detection of the termination signal of another color is different, the controller sets a frequency of a video clock corresponding to the final termination signal based on the initial termination signal.

9. The color image forming apparatus of claim 8, wherein if the termination signal for the another color is relatively later compared to the initial termination signal, the controller sets the frequency of the video clock applied to the another color to be greater than the frequency of the video clock applied to the one color.

10. A method of controlling a color image forming apparatus having a plurality of laser scanning units corresponding to respective colors to output a horizontal synchronization signal and a termination signal to scan a line, the method comprising:
    detecting the horizontal synchronization signal and the termination signal corresponding to each respective color with a signal detecting unit mounted adjacent to the laser scanning units; and
    correcting an error between a scanning line of a first color of the respective colors and a scanning line of a second color of the respective colors based on a difference of detection times between the termination signal corresponding to the first color and the termination signal corresponding to the second color.

11. The method of claim 10, wherein correcting the error comprises:
    variably setting frequencies of video clocks for each color in accordance with the difference between the termination signals for each color;
    outputting video clocks in accordance with the variably set frequencies; and
    generating video data in accordance with the video clocks.

12. The control method of claim 11, wherein if the detection time of the termination signal of one color is relatively later than the detection time of another color, the frequency of the video clock applied to the one color is greater than the frequency of the video clock applied to the another color.

13. The method of claim 11, wherein if a time difference occurs between the termination signals of each color, the frequency of the video clock of each color is set corresponding to a final termination signal based on an initial termination signal.

14. A color image forming apparatus, comprising:
    a plurality of laser scanning units to each output a horizontal synchronization signal and a termination signal corresponding to a position of a scanned line;
    a signal detecting unit to detect the termination signal and the horizontal synchronization signal corresponding to each of the plurality of laser scanning units; and
    a controller to correct a position error between the scanned line corresponding to a first laser scanning unit of the plurality of laser scanning units and the scanned line corresponding to a second laser scanning unit of the plurality of laser scanning units based on a difference of detection times between the termination signal corresponding to the first laser scanning unit and the termination signal corresponding to the second laser scanning unit.

15. The color image forming apparatus of claim 14, wherein the controller corrects the position error without considering a scanning time between the horizontal synchronization signal and the termination signal.

16. The color image forming apparatus of claim 14, further comprising a video clock generator to count a time difference between the termination signals of each scanning unit, and to variably set a video clock frequency for each scanning unit based on the time difference between each termination signal.

17. The color image forming apparatus of claim 16, wherein the video clock frequency of an earliest detected termination signal is used as a reference frequency, and wherein the video clock frequencies of later detected termination signals are variably set to be larger than the reference frequency according to the time difference between the later detected termination signal and the earliest detected termination signal.

18. The color image forming apparatus of claim 14, wherein the signal detecting unit comprises a single sensor to detect both the horizontal synchronization signal and the termination signal, and a reflection mirror to reflect either one or both of the horizontal synchronization signal and the termination signal to the single sensor.

19. A method of controlling a color image forming apparatus having a plurality of laser scanning units, the method comprising:
  detecting a horizontal synchronization signal and a termination signal corresponding to a position of a scanned line from each laser scanning unit; and
  correcting a position error between the scanned line corresponding to a first laser scanning unit of the plurality of laser scanning units and the scanned line corresponding to a second laser scanning unit of the plurality of laser scanning units based on a difference of detection times between the termination signal corresponding to the first laser scanning unit and the termination signal corresponding to the second laser scanning unit.

20. The method of claim 19, wherein an earliest detected termination signal is used as a reference signal, and the correcting is based on a difference of detection times between the reference signal and the other termination signals.

21. A method of controlling a color image forming apparatus having a plurality of laser scanning units to output a line corresponding to each laser scanning unit, the method comprising:
  detecting a termination point of each line; and
  correcting a position error of the line corresponding to a first laser scanning unit of the plurality of laser scanning units and the line corresponding to a second laser scanning unit of the plurality of laser scanning units based on a difference of the termination point of the line corresponding to the first laser scanning unit and the termination point of the line corresponding to the second laser scanning unit, without counting a scanning time of the lines.

22. A color image forming apparatus, comprising:
  a plurality of laser scanning units to output a line corresponding to each laser scanning unit;
  a detecting unit to detect a termination point of each line; and
  a controller to correct a position error of the line corresponding to a first laser scanning unit of the plurality of laser scanning units and the line corresponding to a second laser scanning unit of the plurality of laser scanning units based on a difference of the termination point of the line corresponding to the first laser scanning unit and the termination point of the line corresponding to the second laser scanning unit, without counting a scanning time of the lines.

* * * * *